Oct. 31, 1933.   H. C. BERRY   1,933,238
STRAIN GAUGE
Filed Aug. 8, 1929
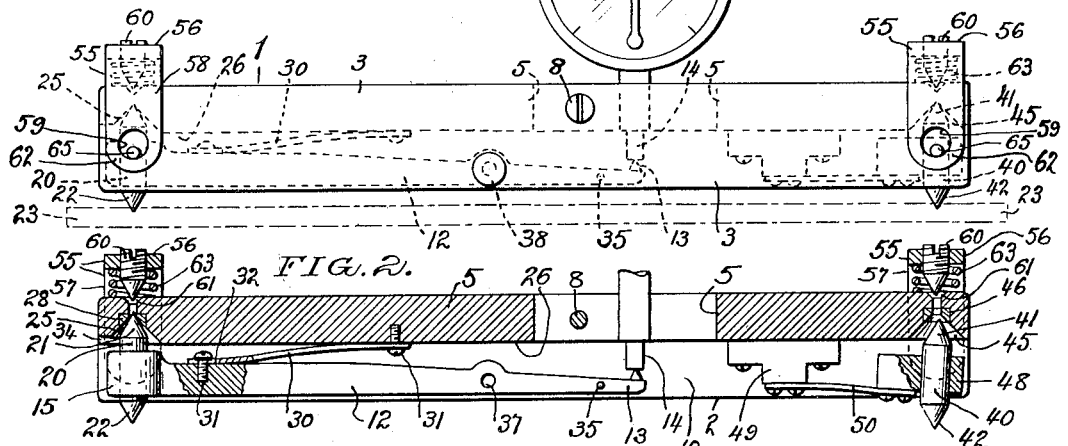
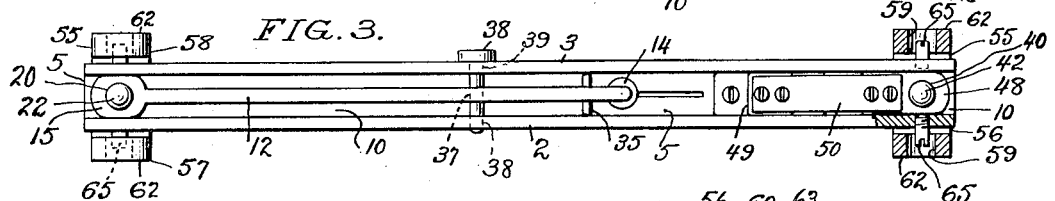
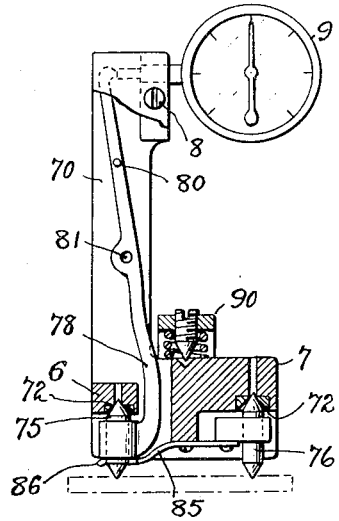
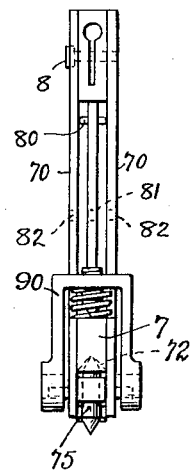
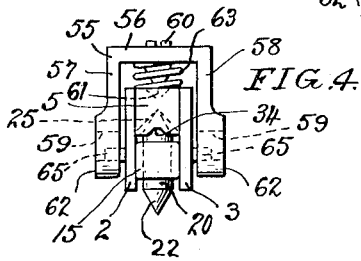
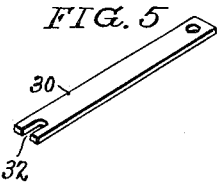
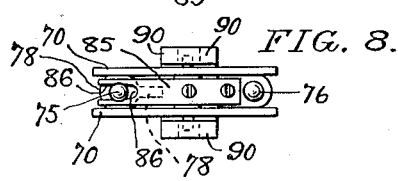
Inventor:
Herman Claude Berry
By P. DeWitt Goodwin
Attorney Patented Oct. 31, 1933

1,933,238

UNITED STATES PATENT OFFICE 1,933,238

STRAIN GAUGE

Herman Claude Berry, Moylan, Pa.

Application August 8, 1929. Serial No. 384,348

17 Claims. (Cl. 33—148)

My invention relates to improvements in a strain gauge, particularly adapted for measuring variations in a specimen which may be placed under compression, or extension strains, for testing purposes. Strain gauges of this character have means for operatively mounting thereon an indicating instrument, or micrometer from which readings may be taken, in a manner well known in the art.

The object of my invention is to provide a novel form of strain gauge with which more accurate readings may be obtained than heretofore; a further object of my invention is to provide a novel arrangement of the frame of the strain gauge and the bearing pins, in which the latter are provided with bearing points at opposite ends thereof, and said pins being positioned at approximately right angles to the length of the frame, with the inner points of the pins mounted in bearings in the frame and the outer points of the pins engaging the specimen to be tested; a still further object is to mount an indicating lever upon one of the pins whereby the oscillation of the pin relatively to the frame, will actuate the lever for indicating variations in the length of the specimen, and variations in the distance between the outer ends of the pins; a still further object of my invention is to yieldingly hold the pins in operative relation with the frame, and to provide means whereby one of said pins is detachably mounted upon the frame; a further object of my invention is to provide means for yieldingly holding the pins relatively to the frame whereby the outer ends of the pins may be readily moved relatively to the frame and to each other, for the purpose of directing and inserting the outer ends of the pins into punch marks, or depressions, formed in the specimen; thus avoiding the distortion of said marks, or depressions, due to repeated tests made upon the same specimen.

Heretofore the engaging pins of the strain gauge were located as nearly as possible to the marks, or depressions, upon the specimen, and then the pins were forced to the bottom of the marks, or depressions, which caused a wearing of the specimen, and also inaccuracy in the successive readings of the instrument, due to repeatedly forcing the pins into the marks or depressions, of the specimen.

A still further object is to provide means for positioning the flexibly mounted pin at right angles to the surface of the frame when the pin is fully seated in the bearing in the frame, thus insuring the pin always assuming a constant angle relatively to the frame and the specimen when pressure is applied to the frame in the direction of the specimen through the pins; a still further object is to provide a stop upon the frame for engaging the lever, for operating the indicating instrument, so that the lever will be held in a fixed position, thus permitting the stem of the instrument to be brought to a given starting position before placing the strain gauge upon the specimen; and a still further object is to provide a member forming a finger grip, which member is pivotally mounted upon the frame in such a manner that force may be applied by the fingers to the frame in a direction perpendicular to the frame and to the specimen, thus avoiding the tendency to move the frame longitudinally relatively to the specimen when force is applied directly to the frame. These together with various other novel features of construction and arrangement of the parts, which will be more fully hereinafter described and claimed, constitute my invention.

Referring to the accompanying drawing; Fig. 1 is a side elevation of my improved strain gauge, shown mounted upon a specimen which is to be tested; Fig. 2 is a vertical longitudinal sectional view of Fig. 1; Fig. 3 is an inverted plan view of the strain gauge partly in section; Fig. 4 is an end view of Fig. 1; Fig. 5 is a perspective view showing the spring for detachably holding the indicating lever as shown in Fig. 2; Fig. 6 is a vertical longitudinal sectional view of a different form of strain gauge embodying my invention; Fig. 7 is an end elevation of Fig. 6, and Fig. 8 is an inverted plan view of Fig. 6.

Referring to the accompanying drawing in which like reference characters refer to like parts, 1 represents a frame consisting of cheek pieces 2 and 3, and a spacing bar 5, which latter may extend the full length of the cheek pieces or be made in sections 6 and 7, as shown in Fig. 6. The bar 5 is rigidly secured between the cheek pieces 2 and 3 by suitable fastening devices not shown. The frame 1 is provided with a clamp screw 8 for holding an indicating instrument 9 in the usual manner. The spacing bar 5 and cheek pieces form a channel 10 extending throughout the length of the frame.

A lever 12 is operatively mounted within the channel 10 and is provided with a free end 13 adapted to engage the operating stem 14 of the instrument 9. The opposite end of the lever 12 is provided with a head 15 rigidly secured upon a pin 20, with its opposite ends projecting through the head 15 of the lever. The pin 20 is provided with conical bearing points 21 and 22, the latter projecting from the frame and adapted for engaging a specimen 23, shown in dot and dash lines, Fig. 1.

The inner end 21 of the pin 20 is seated in a cavity 25 formed in the face 26 of the spacing bar 3, which face 26 forms the lower wall of the channel 10. Said cavity 25 is preferably of conical shape and larger in area than the conical point 21 so that the pin may oscillate in the bearing formed by the cavity 25. A bushing 28 of relatively hardened material is inserted in the bar and forms a hardened bearing for the pin. The head 15 of the lever 12 fits loosely between the cheek pieces 2 and 3 of the frame, so that the lever 12 will be free to oscillate in the channel 10 formed by the cheek pieces.

The lever 12 is held within the channel 10 of the frame, with the point 21 of the pin seated in the cavity 25, by means of a spring 30, shown detached in Fig. 5. Said spring is held upon the bar 5 and upon the lever 12 by means of fastening devices in the form of screws 31. The spring 30 has a slotted end portion 32 adapted to embrace a screw 31 which permits the screw to be withdrawn from the end of the slot 32, thus forming a detachable connection at one end of the spring, which will permit the lever to be withdrawn from the channel 10 formed between the cheek pieces, and the slot 32 will also permit the lever to oscillate with the pin 20 relatively to the frame.

The spring 30 tends to hold the pin 20 in the cavity 25 and the cavity prevents the pin and lever from moving longitudinally relatively to the frame, unless the spring 30 is flexed sufficiently for the point 21 of the pin to be withdrawn from the cavity 25. The end of the spacing bar 5, adjacent to the cavity 25, is provided with a longitudinal groove 34 for the free passage of the point 21 of the pin 20, when the lever is being inserted or removed from the frame.

The free end 13 of the lever is provided with a cross pin 35 which projects equally on opposite sides of the lever 12, with the ends of the cross pin terminating adjacent to the inner surfaces of the cheek pieces 2 and 3, so that the cross pin will work freely between them. Said cross pin forms a spacing means for holding the free end of the lever in a central position within the channel 10 of the frame.

The lever 12 is provided adjacent to its free end 13 with a hole 37 and the cheek pieces are provided with holes 38 and 39, which align with the hole 37 in the lever when the lever is in a position in which the bearing pin 20 is perpendicular to the facing surface 26 of the bar 5. A locking pin 38 shown in Figs. 1 and 3, but not shown in Fig. 2, may be inserted through said holes formed in the cheek pieces and the lever for holding the lever in a fixed position to facilitate the clamping of the instrument 9 in a given position relatively to the free end 13 of the lever. By this arrangement the instrument 9 may be placed upon the frame and the hand or dial of the instrument turned to a zero point. The locking pin 38 is then removed so that the lever 12 may oscillate.

Located at the opposite end of the frame from the pin 20, is a second pin 40 having points 41 and 42 formed upon opposite ends thereof, the outer point 42 being adapted to engage the specimen 22. The inner point 41 of the pin is adapted to seat in a bearing in the form of a conical cavity 45 formed in the spacing bar, which cavity is also provided with a hardened bushing 46. The pin 40 is mounted upon a block 48, which is rigidly secured to the medial portion of the pin 40.

The block 48 is rigidly mounted upon one end of a flexible member or spring 50 having its opposite end secured to a rigid bearing block 49 secured to the spacing bar 5. The block 48 is movably mounted between the cheek pieces 2 and 3 which form means for guiding the block 48 and the pin 40 in a plane extending longitudinal of the frame and channel 10.

The spring 50 permits the pin 40 to be withdrawn slightly from the cavity so that the pin may be tilted at different angles, as shown in Fig. 2, permitting the outer end 42 of the pin 40 to be readily inserted into a punch mark or depression formed in the specimen, so that the outer end of the pin will seat fully in the mark or depression instead of sliding into the depression when pressure is put upon the frame to hold the pins upon the specimen, thus avoiding injuring or deforming the punch marks or depressions in the specimen due to repeated insertions of the pins.

The inner end 41 of the pin 40 will slide over the hardened bushing 48 and find a seat in the bottom of the cavity when the frame is forced toward the specimen, and as the pin and bushing are of hardened material very little wear will take place in said parts. The flexible member or spring 50 is of such length, and has sufficient rigidity to hold the pin 40 perpendicular to the facing surface 26 of the bar 5 in which the cavity 45 is formed, therefore when pressure is placed upon the frame the pin 40 will slide to the bottom of the cavity 45 and find a bearing therein, thus causing the pin 40 to be tilted by the spring into a position perpendicular to the bar 5.

The spring 50 is of a given length, or adjusted by means of the fastening devices, so that when the pin 40 is fully seated in the cavity 45 in the bar 5, the longitudinal axis of the pin will be at right angles to the length of the bar or frame, and the angular position of the axis of the pin, relatively to the specimen, will be uniform when the pin 20 is also resting upon the specimen. By this means the pin 40 is rigidly held in a fixed angular position relatively to the frame and to the specimen when the frame is held tightly against the specimen.

A pivot member, or finger grip 55, is provided for exerting pressure upon the frame toward the specimen for insuring the pressure being inserted at right angles to the length of the specimen, thus avoiding the tendency of exerting the pressure obliquely to the frame which would tend to move the latter longitudinally relatively to the specimen. The finger grip 55 consists of a top plate 56, connecting side plates 57 and 58, which embrace the cheek pieces 2 and 3 of the frame. The top plate 56 is provided with a bearing pin 60 located centrally between the side plates and provided at its inner end with a conical point which may be pivotally mounted in a bearing cavity 61 formed in the upper face of the frame or spacing bar 5. A spring 63 tends to move the top plate 56 away from the spacing bar 5, as shown in the drawing.

The movement of the top plate 56 by the spring 62 is limited by a stop pin, or pins, 65 secured in and projecting from the cheek pieces 2 and 3, as shown in Figs. 3 and 4. The side plates 57 and 58 are provided with apertures 59 which are larger in diameter than the diameter of the stop pins 65 and thus permit the side plates to swing upon the pin 60 and also form means for limiting the movement of the side plates in a plan extending longitudinally of the frame when the bearing pin 60 is seated in the cavity 61 upon the spacing bar.

The free ends of the side plates 57 and 58 form finger grip portions 62 located close to the outer points of the pins 20 and 40, by which pressure may be applied to the frame adjacent to the specimen. When pressure is applied to the finger grip portions 62 of the side plates, the spring 63 will be contracted until the bearing pin 60 rests upon the spacing bar 5 and the stop pins 65 will occupy a central position in the apertures 59 formed in the side plates. The finger grips 55 are preferably located upon the frame in the same transverse plane in which the pins 20 and 40 are located, with the bearing pins 60 in alignment with the pins 20 and 40, thus the finger grip portions 62 will swing as stirrups, so that the pressure will be applied transversely to the length of the frame. The stop pins 65 will not be engaged by the side plates 57 and 58 unless the pressure is inclined obliquely to the length of the frame, causing the side paltes to swing upon the bearing pins 60; when the stop pins 65 engage the walls of the apertures 59 of the side plates said pins 65 will indicate that the line of force is not in a plane extending transversely to the length of the frame.

Fig. 6 shows a modified form of a strain gauge in which the cheek pieces 70 are rigidly secured to a spacing bar, which is formed in different sections 6 and 7 as above mentioned. The end sections, relatively to the length of the frame, are provided with cavities 71 and 72 for receiving the inner ends of the pins 75 and 76, which are adapted to engage the specimen in the manner above described.

The lever 78 for operating the indicating instrument 9 extends in a general direction in alignment with the length of the pin 75, on which the lever is secured, and the free end of the lever is provided with a cross pin 80 which is guided between the cheek pieces 70 for operating the indicating instrument in the usual manner.

The lever and cheek pieces are provided with holes 81 and 82 respectively, to receive a locking pin, similar to the pin 38, shown in Figs. 1 and 3. The lever 78 is held in the cavity 71 by a spring 85, which spring is provided with a slot 86, shown in Fig. 8, which allows the pin 75 and the lever 78 to oscillate upon the bearing 71. A finger grip member 90, similar to those above described, is mounted upon the frame midway between the pins 75 and 76, for exerting a pressure upon the pins at right angles to the specimen.

The operation of my invention is as follows: The locking pin 38 is inserted into the apertures of the cheek pieces and lever for holding the lever in a fixed position. The indicating instrument 9 is then clamped upon the frame and set to a zero position. The stop pin 38 is then removed. The pin 20 is inserted into a punch mark or depression formed in a specimen to be measured. The pin 40, at the opposite end of the frame, is tilted relatively to the frame until the outer point 42 rests fully in the mark or depression formed in the specimen. Pressure is applied by the fingers by means of the finger grip members, first forcing the inner end of the pin 40 into the bottom of the cavity 45 formed in the bar or frame, which positions the pin 40 at right angles to the frame and the specimen.

The pressure of the fingers applied to the finger grip members will cause the side plates 57 and 58 to swing relatively to the stop pins 65, and when the stop pins are located concentrically with the apertures 59 formed in the cheek pieces, the pressure will be applied at right angles to the length of the specimen.

My improved strain gauge provides means for obtaining successive readings from a specimen, which readings are uniform, thus overcoming the difficulty heretofore found in an instrument which would not give uniform readings when applied successively to the same specimen. By yieldingly mounting the pins 20 and 40 upon the frame the marks or depressions formed in the specimen are not injured or deformed by successive insertions of the pins in the specimen.

Various changes in the construction and arrangement of the parts may be made without departing from my invention.

I claim:—

1. A strain gauge comprising a frame, pins located at opposite ends of said frame, said pins having conical points formed upon their inner ends, each pin having an end thereof projecting from the frame to engage a specimen to be measured, said frame having cavities to receive the inner ends of said pins, means located between the frame and one of said pins for yieldingly holding the latter perpendicular to the length of the frame, yielding means located between the frame and the other one of said pins for detachably holding the latter pin adjacent to said frame, and a lever upon the last mentioned pin.

2. A strain gauge comprising a frame, pins located at opposite ends of said frame and normally extending approximately at right angles to the length of the frame, said pins having their outer ends formed to engage a specimen to be measured, a lever mounted upon the medial portion of one of said pins and adapted for actuating an indicating instrument, said pin upon which the lever is mounted having a conical bearing point formed upon its inner end, said frame having a cavity of conical formation formed therein and forming a bearing in which the inner end of the last mentioned pin is universally mounted, and yielding means located between the frame and the last mentioned pin for detachably holding said last mentioned pin adjacent to the frame.

3. A strain gauge comprising a frame, a lever having a free end portion adapted for actuating an indicating instrument, a pin having conical points formed at opposite ends thereof, said lever having its opposite end rigidly secured upon the medial portion of said pin, said frame having a cavity formed therein adapted to be occupied by one end of said pin, the opposite end of said pin projecting from said frame for engaging a specimen to be measured, and a second pin mounted upon said frame and adapted for engaging said specimen.

4. A strain gauge comprising a spacing bar, cheek pieces upon said bar forming a channel along one longitudinal face of the bar, a lever located in said channel, a pin upon the medial portion of which one end of said lever is rigidly mounted, said pin having conical bearing ends formed in axial alignment, said bar having a conical cavity formed therein in which one end of said pin is adapted to oscillate as a bearing, said pin having its opposite end projecting from said channel, beyond the cheek pieces for engaging a specimen to be measured, and a pin located upon the opposite end of said bar for engaging said specimen.

5. A strain gauge comprising a spacing bar, cheek pieces upon opposite sides of said bar forming a channel along one longitudinal face of the bar, a lever positioned in said channel, a pin upon which one end of said lever is rigidly mounted, said pin having bearing ends formed at opposite ends thereof, said bar having a cavity formed in said longitudinal face to receive one end of said pin, a spring operatively associated with said bar and with said lever and arranged for holding the pin in said cavity, said pin having its opposite end projecting from said channel beyond the cheek pieces for engaging a specimen to be measured, said cheek pieces having portions thereof projecting from said longitudinal face of the bar forming guides between which said pin and said lever are movable in a plane extending parallel relatively to the length of the bar and perpendicular to said face of the bar in which said cavity is located, and a pin located upon the opposite end of said bar for engaging said specimen.

6. A strain gauge comprising a spacing bar, cheek pieces upon opposite sides of said bar forming a channel along one longitudinal face of the bar, a lever mounted in said channel, a pivot pin upon which one end of said lever is rigidly mounted, said pin having bearing ends formed at opposite ends thereof, said bar having a cavity formed therein in which one end of said pin is adapted to rest as a bearing, a spring operatively associated with said bar and with said lever and arranged for holding the pin in said cavity, said pin having its opposite end projecting from said channel beyond the cheek pieces for engaging a specimen to be measured, said cheek pieces forming guides for guiding said pin and said lever in a plane extending parallel relatively to the length of the bar and perpendicular to the face of the bar in which said cavity is located, a cross pin upon the opposite end of said lever from that upon which the pivot pin is mounted, said cross pin projecting at equal distances from said lever, and said cheek pieces arranged to extend a sufficient distance from said longitudinal face of said bar to form guides engageable by the opposite ends of said cross pin for locating the free end of the lever centrally of said channel formed between the cheek pieces.

7. A strain gauge comprising a frame, a lever having a free end portion for actuating an indicating instrument, a pin having conical points formed upon the opposite ends thereof upon which pin the opposite end of said lever is secured, said frame having a cavity formed therein adapted to be occupied by one end of said pin, a spring associated with said frame and said lever for holding the pin in said cavity and permitting the pin and lever to oscillate upon said frame, a second pin for engaging a specimen, and yielding means for holding said last mentioned pin upon the frame.

8. A strain gauge comprising a frame, a pin having one end projecting from the frame for engaging a specimen to be measured, said frame having a cavity therein forming a bearing to receive the inner end of the pin, means upon the frame on which the pin is mounted for holding the pin in a given angular position relatively to the frame when the pin is fully seated in said cavity and permitting movement of the pin when not seated in said cavity, a lever operatively mounted upon said frame and adapted for actuating an indicating instrument, and a pin upon said lever having its outer end projecting from said frame for engaging said specimen and for actuating the lever relatively to variations in the distance between the outer ends of said pins.

9. A strain gauge comprising a frame, a pin having one end projecting from the frame for engaging a specimen to be measured, said frame having a cavity therein forming a bearing to receive the inner end of the pin, a flexible member having one end rigidly associated with the frame and its other end secured to the pin for holding the latter in a given angular position relatively to the frame when the pin is fully seated in said cavity and permitting movement of the pin relatively to the frame when not fully seated in said cavity, a lever operatively mounted upon said frame and adapted for actuating an indicating instrument, and a pin upon said lever having its outer end projecting from said frame for engaging said specimen and for actuating the lever relatively to variations in the distance between the outer ends of said pins.

10. A strain gauge comprising a frame, a pin having one end projecting from the frame for engaging a specimen to be measured, said pin having a conical inner end, said frame having a conical cavity formed therein, means upon the frame on which the pin is mounted for holding the pin in a given angular position relatively to the frame when the pin is fully seated in said cavity and permitting movement of the pin when not seated in said cavity, a lever operatively mounted upon said frame, and a pin upon said lever having its outer end projecting from said frame for engaging said specimen and for actuating the lever relatively to variations in the distance between the outer ends of said pins.

11. A strain gauge comprising a frame, a pin having one end projecting from the frame for engaging a specimen to be measured, said pin having a conical inner end, said frame having a conical cavity formed therein, a flexible member having one end rigidly associated with the frame and its other end secured to the pin for holding the latter in a given angular position relatively to the frame when the pin is fully seated in said cavity and permitting movement of the pin relatively to the frame when not fully seated in said cavity, a lever operatively mounted upon said frame, and a pin upon said lever having its outer end projecting from said frame for engaging said specimen and for actuating the lever relatively to the variations in the distance between the outer ends of said pins.

12. A strain gauge comprising a frame, said frame having a conical cavity formed therein, a pin having conical ends, an enlarged boss rigidly associated with the medial portion of the pin, a plate spring having one end secured to said frame and its other end secured to said boss for holding the pin in a given angular position relatively to the frame when the pin is fully seated in said conical cavity, said spring permitting movement of the pin when not fully seated in said cavity and allowing the pin to be tilted relatively to the frame and its outer end to be readily inserted in a cavity formed in a specimen, a lever pivotally mounted upon the frame, and a pin upon said lever for engaging the specimen to be measured.

13. A strain gauge comprising a frame, a lever pivotally mounted upon the frame, a pin upon said lever for engaging a specimen to be measured, a pin upon said frame for engaging said specimen, a finger grip member upon said frame, and a pivotal bearing between said member and the frame upon which said member may swing in a plane extending parallel to the length of the frame and perpendicular to the specimen.

14. A strain gauge comprising a frame, a lever pivotally mounted upon the frame, a pin upon said lever for engaging a specimen to be measured, a pin upon said frame for engaging said specimen, a top plate pivotally mounted upon the frame adjacent to one of said pins, side plates upon said top plate located at opposite sides of the frame and loosely embracing the latter, said side plates forming finger grips through which pressure may be applied to the frame and pins in a direction perpendicular to the specimen.

15. A strain gauge comprising a frame, a lever pivotally mounted upon the frame, a pin upon said lever for engaging a specimen to be measured, a pin upon said frame for engaging said specimen, a top plate pivotally mounted upon the frame, side plates upon said top plate located at opposite sides of the frame and loosely embracing the latter, said side plates forming finger grips through which pressure may be applied to the frame and the pins in a direction perpendicular to the specimen, and means upon the frame for engaging one of said side plates for limiting the pivotal movement of the side plate relatively to the length of the frame.

16. A strain gauge comprising a frame, a lever pivotally mounted upon the frame, a pin upon said lever for engaging a specimen to be measured, a pin upon said frame for engaging said specimen, a finger grip member comprising a top cross plate and side plates embracing the frame, a pivot pin mounted upon said cross plate, said frame having a cavity formed therein to receive the inner end of the pivot pin, a spring tending to lift said cross plate from said frame, a stop-pin upon said frame located adjacent to one of said side plates, said side plates having a recess formed therein occupied by one end of said stop-pin, said recess being of larger area than the stop-pin and thereby permitting the spring to move the cross plate away from said frame and permitting the side plates to swing relatively to the stop-pin.

17. A strain gauge comprising a frame, a lever having a free end portion for actuating an indicating instrument, a pin upon which the opposite end of said lever is mounted, said frame having a cavity formed therein adapted to be occupied by one end of said pin, a spring located between said frame and said lever, fastening devices upon said frame and upon said lever for engaging the ends of the spring whereby the latter will tend to hold said pin in said cavity, and said spring having a slot formed in one end thereof permitting the spring to be detached from one of said fastening devices when the lever is moved longitudinally relatively to the frame.

HERMAN CLAUDE BERRY.